(12) United States Patent
Chapman

(10) Patent No.: US 9,564,835 B2
(45) Date of Patent: Feb. 7, 2017

(54) INVERTER COMMUNICATIONS USING OUTPUT SIGNAL

(71) Applicant: SunPower Corporation, San Jose, CA (US)

(72) Inventor: Patrick L. Chapman, Austin, TX (US)

(73) Assignee: SunPower Corporation, San Jose, CA (US)

(*) Notice: Subject to any disclaimer, the term of this patent is extended or adjusted under 35 U.S.C. 154(b) by 713 days.

(21) Appl. No.: 13/871,169

(22) Filed: Apr. 26, 2013

(65) Prior Publication Data
US 2014/0268958 A1    Sep. 18, 2014

Related U.S. Application Data

(60) Provisional application No. 60/801,835, filed on Mar. 15, 2013.

(51) Int. Cl.
*H02M 7/5395*    (2006.01)
*H02J 3/38*    (2006.01)
*H02J 13/00*    (2006.01)

(52) U.S. Cl.
CPC ............ *H02M 7/5395* (2013.01); *H02J 3/383* (2013.01); *H02J 13/0024* (2013.01);
(Continued)

(58) Field of Classification Search
CPC ...... H02M 7/42; H02M 7/5395; H02M 7/525; H02M 7/527; H02M 7/4807; H02J 3/387; H02J 13/0024; H02J 3/383; Y10T 307/707; Y02E 10/563; Y02E 40/72; Y04S 10/123
(Continued)

(56) References Cited

U.S. PATENT DOCUMENTS 3,670,230 A    6/1972    Rooney et al.
4,114,048 A    9/1978    Hull
(Continued)

FOREIGN PATENT DOCUMENTS

CA    2353422 C    3/2004
CA    2655007 A1    8/2010
(Continued)

OTHER PUBLICATIONS

Falk et al. (PCT/EP2011/069453), Method for Operation of a Photovoltaic Installation for Feeding Electrical Power into a Medium-Voltage Power Supply Grid, May 18, 2012, PCT, Entire Document.*

(Continued)

*Primary Examiner* — Jessica Han
*Assistant Examiner* — Demetries A Gibson
(74) *Attorney, Agent, or Firm* — Barnes & Thornburg LLP

(57) ABSTRACT

Technologies for communicating information from an inverter configured for the conversion of direct current (DC) power generated from an alternative source to alternating current (AC) power are disclosed. The technologies include determining information to be transmitted from the inverter over a power line cable connected to the inverter and controlling the operation of an output converter of the inverter as a function of the information to be transmitted to cause the output converter to generate an output waveform having the information modulated thereon.

12 Claims, 8 Drawing Sheets

(52) U.S. Cl.
CPC ............ *Y02E 10/563* (2013.01); *Y02E 40/72* (2013.01); *Y04S 10/123* (2013.01)

(58) Field of Classification Search
USPC .............. 363/97, 15, 17, 109, 51, 35, 21.02, 40,363/98, 132, 131, 41; 323/247, 207, 906
See application file for complete search history.

(56) References Cited

U.S. PATENT DOCUMENTS

| | | | |
|---|---|---|---|
| 4,217,633 A | 8/1980 | Evans | |
| 4,277,692 A | 7/1981 | Small | |
| 4,287,465 A | 9/1981 | Godard et al. | |
| 4,651,265 A | 3/1987 | Stacey et al. | |
| 4,661,758 A | 4/1987 | Whittaker | |
| 4,707,774 A | 11/1987 | Kajita | |
| 4,709,318 A | 11/1987 | Gephart et al. | |
| 4,719,550 A | 1/1988 | Powell et al. | |
| 4,725,740 A | 2/1988 | Nakata | |
| 5,041,959 A | 8/1991 | Walker | |
| 5,148,043 A | 9/1992 | Hirata et al. | |
| 5,160,851 A | 11/1992 | McAndrews | |
| 5,191,519 A | 3/1993 | Kawakami | |
| 5,309,073 A | 5/1994 | Kaneko et al. | |
| 5,343,380 A | 8/1994 | Champlin | |
| 5,473,528 A | 12/1995 | Hirata | |
| 5,625,539 A * | 4/1997 | Nakata | H02M 7/4807 363/132 |
| 5,668,464 A | 9/1997 | Krein | |
| 5,684,385 A | 11/1997 | Guyonneau et al. | |
| 5,721,481 A | 2/1998 | Narita et al. | |
| 5,745,356 A | 4/1998 | Tassitino | |
| 5,796,182 A | 8/1998 | Martin | |
| 5,801,519 A | 9/1998 | Midya et al. | |
| 5,886,890 A | 3/1999 | Ishida et al. | |
| 5,929,537 A | 7/1999 | Glennon | |
| 5,978,236 A | 11/1999 | Faberman et al. | |
| 5,982,645 A | 11/1999 | Levran et al. | |
| 6,046,402 A | 4/2000 | More | |
| 6,154,379 A | 11/2000 | Okita | |
| 6,157,168 A | 12/2000 | Malik | |
| 6,180,868 B1 | 1/2001 | Yoshino et al. | |
| 6,201,180 B1 | 3/2001 | Meyer et al. | |
| 6,201,319 B1 | 3/2001 | Simonelli et al. | |
| 6,225,708 B1 | 5/2001 | Furukawa | |
| 6,268,559 B1 | 7/2001 | Yamawaki | |
| 6,285,572 B1 | 9/2001 | Onizuka et al. | |
| 6,291,764 B1 | 9/2001 | Ishida et al. | |
| 6,311,279 B1 | 10/2001 | Nguyen | |
| 6,356,471 B1 | 3/2002 | Fang | |
| 6,369,461 B1 | 4/2002 | Jungreis et al. | |
| 6,381,157 B2 | 4/2002 | Jensen | |
| 6,445,089 B1 | 9/2002 | Okui | |
| 6,462,507 B2 | 10/2002 | Fisher | |
| 6,489,755 B1 | 12/2002 | Boudreaux et al. | |
| 6,563,234 B2 | 5/2003 | Hasegawa et al. | |
| 6,605,881 B2 | 8/2003 | Takehara et al. | |
| 6,614,132 B2 | 9/2003 | Hockney et al. | |
| 6,624,533 B1 | 9/2003 | Swanson | |
| 6,657,321 B2 | 12/2003 | Sinha | |
| 6,700,802 B2 | 3/2004 | Ulinski et al. | |
| 6,727,602 B2 | 4/2004 | Olson | |
| 6,750,391 B2 | 6/2004 | Bower et al. | |
| 6,765,315 B2 | 7/2004 | Hammerstrom | |
| 6,770,984 B2 | 8/2004 | Pai | |
| 6,795,322 B2 | 9/2004 | Aihara et al. | |
| 6,838,611 B2 | 1/2005 | Kondo et al. | |
| 6,847,196 B2 | 1/2005 | Garabandic | |
| 6,881,509 B2 | 4/2005 | Jungreis | |
| 6,882,063 B2 | 4/2005 | Droppo et al. | |
| 6,950,323 B2 | 9/2005 | Achleitner | |
| 7,031,176 B2 | 4/2006 | Kotsopoulos et al. | |
| 7,072,195 B2 | 7/2006 | Xu | |
| 7,091,707 B2 | 8/2006 | Cutler | |
| 7,193,872 B2 | 3/2007 | Siri | |
| 7,233,130 B1 | 6/2007 | Kay | |
| 7,289,341 B2 | 10/2007 | Hesterman | |
| 7,319,313 B2 | 1/2008 | Dickerson et al. | |
| 7,324,361 B2 | 1/2008 | Siri | |
| 7,339,287 B2 | 3/2008 | Jepsen et al. | |
| 7,365,998 B2 | 4/2008 | Kumar et al. | |
| 7,405,494 B2 | 7/2008 | Tassitino, Jr. et al. | |
| 7,420,354 B2 | 9/2008 | Cutler | |
| 7,432,691 B2 | 10/2008 | Cutler | |
| 7,463,500 B2 | 12/2008 | West | |
| 7,502,697 B2 | 3/2009 | Holmquist et al. | |
| 7,521,914 B2 | 4/2009 | Dickerson et al. | |
| 7,531,993 B2 | 5/2009 | Udrea et al. | |
| 7,551,460 B2 | 6/2009 | Lalithambika et al. | |
| 7,577,005 B2 | 8/2009 | Angerer et al. | |
| 7,592,789 B2 | 9/2009 | Jain | |
| 7,609,040 B1 | 10/2009 | Jain | |
| 7,626,834 B2 | 12/2009 | Chisenga et al. | |
| 7,638,899 B2 | 12/2009 | Tracy et al. | |
| 7,646,116 B2 | 1/2010 | Batarseh et al. | |
| 7,660,139 B2 | 2/2010 | Garabandic | |
| 7,667,610 B2 | 2/2010 | Thompson | |
| 7,693,174 B2 | 4/2010 | Ishibashi et al. | |
| 7,710,752 B2 | 5/2010 | West | |
| 7,733,679 B2 | 6/2010 | Luger et al. | |
| 7,768,155 B2 | 8/2010 | Fornage | |
| 7,777,587 B2 | 8/2010 | Stevenson et al. | |
| 7,796,412 B2 | 9/2010 | Fornage | |
| RE41,965 E | 11/2010 | West | |
| 7,839,022 B2 | 11/2010 | Wolfs | |
| 7,855,906 B2 | 12/2010 | Klodowski et al. | |
| RE42,039 E | 1/2011 | West et al. | |
| 7,884,500 B2 | 2/2011 | Kernahan | |
| 7,899,632 B2 | 3/2011 | Fornage et al. | |
| 7,916,505 B2 | 3/2011 | Fornage | |
| 8,076,802 B2 | 12/2011 | Fornage | |
| 8,189,789 B2 | 5/2012 | Coan et al. | |
| 2001/0043050 A1 | 11/2001 | Fisher | |
| 2002/0017822 A1 | 2/2002 | Umemura et al. | |
| 2002/0196026 A1 | 12/2002 | Kimura et al. | |
| 2004/0128387 A1 | 7/2004 | Chin et al. | |
| 2005/0213272 A1 | 9/2005 | Kobayashi | |
| 2006/0067137 A1 | 3/2006 | Udrea | |
| 2006/0067222 A1 | 3/2006 | Endoh | |
| 2006/0083039 A1 | 4/2006 | Oliveira | |
| 2006/0122857 A1 | 6/2006 | DeCotiis et al. | |
| 2007/0040539 A1 | 2/2007 | Cutler | |
| 2007/0040540 A1 | 2/2007 | Cutler | |
| 2007/0133241 A1 | 6/2007 | Mumtaz et al. | |
| 2007/0221267 A1 | 9/2007 | Fornage | |
| 2007/0253468 A1 | 11/2007 | Pettersen et al. | |
| 2008/0055952 A1 | 3/2008 | Chisenga et al. | |
| 2008/0078436 A1 | 4/2008 | Nachamkin et al. | |
| 2008/0106921 A1 | 5/2008 | Dickerson et al. | |
| 2008/0183338 A1 | 7/2008 | Kimball et al. | |
| 2008/0203397 A1 | 8/2008 | Amaratunga et al. | |
| 2008/0266922 A1 | 10/2008 | Mumtaz et al. | |
| 2008/0272279 A1 | 11/2008 | Thompson | |
| 2008/0283118 A1 | 11/2008 | Rotzoll et al. | |
| 2008/0285317 A1 | 11/2008 | Rotzol | |
| 2008/0304296 A1 | 12/2008 | NadimpalliRaju et al. | |
| 2009/0000654 A1 | 1/2009 | Rotzoll et al. | |
| 2009/0020151 A1 | 1/2009 | Fornage | |
| 2009/0066357 A1 | 3/2009 | Fornage | |
| 2009/0079383 A1 | 3/2009 | Fornage et al. | |
| 2009/0080226 A1 | 3/2009 | Fornage | |
| 2009/0084426 A1 | 4/2009 | Fornage et al. | |
| 2009/0086514 A1 | 4/2009 | Fornage et al. | |
| 2009/0091187 A1* | 4/2009 | Tardy | H02J 3/14 307/38 |
| 2009/0097283 A1 | 4/2009 | Krein et al. | |
| 2009/0147554 A1 | 6/2009 | Adest et al. | |
| 2009/0184695 A1 | 7/2009 | Mocarski | |
| 2009/0200994 A1 | 8/2009 | Fornage | |
| 2009/0225574 A1 | 9/2009 | Fornage | |
| 2009/0230782 A1 | 9/2009 | Fornage | |
| 2009/0242011 A1 | 10/2009 | Proisy | |
| 2009/0242272 A1 | 10/2009 | Little et al. | |

(56) References Cited

U.S. PATENT DOCUMENTS

| | | | |
|---|---|---|---|
| 2009/0243587 A1 | 10/2009 | Fornage | |
| 2009/0244929 A1 | 10/2009 | Fornage | |
| 2009/0244939 A1 | 10/2009 | Fornage | |
| 2009/0244947 A1 | 10/2009 | Fornage | |
| 2009/0278505 A1* | 11/2009 | Toya | H01M 10/052 320/152 |
| 2009/0296348 A1 | 12/2009 | Russell et al. | |
| 2010/0001587 A1* | 1/2010 | Casey | H01L 31/02021 307/80 |
| 2010/0085035 A1 | 4/2010 | Fornage | |
| 2010/0088052 A1 | 4/2010 | Yin et al. | |
| 2010/0091532 A1 | 4/2010 | Fornage | |
| 2010/0106438 A1 | 4/2010 | Fornage | |
| 2010/0138771 A1 | 6/2010 | Kumar et al. | |
| 2010/0139945 A1 | 6/2010 | Dargatz | |
| 2010/0162256 A1 | 6/2010 | Branover et al. | |
| 2010/0175338 A1 | 7/2010 | Garcia Cors | |
| 2010/0176771 A1 | 7/2010 | Fieldhouse et al. | |
| 2010/0181830 A1 | 7/2010 | Fornage et al. | |
| 2010/0195357 A1 | 8/2010 | Fornage et al. | |
| 2010/0195665 A1 | 8/2010 | Jackson | |
| 2010/0214808 A1 | 8/2010 | Rodriguez | |
| 2010/0222933 A1 | 9/2010 | Smith et al. | |
| 2010/0236612 A1 | 9/2010 | Khajehoddin et al. | |
| 2010/0263704 A1 | 10/2010 | Fornage et al. | |
| 2010/0283325 A1 | 11/2010 | Marcianesi et al. | |
| 2010/0309695 A1 | 12/2010 | Fornage | |
| 2011/0012429 A1 | 1/2011 | Fornage | |
| 2011/0019444 A1 | 1/2011 | Dargatz et al. | |
| 2011/0026281 A1 | 2/2011 | Chapman et al. | |
| 2011/0026282 A1 | 2/2011 | Chapman et al. | |
| 2011/0043160 A1 | 2/2011 | Serban | |
| 2011/0049990 A1 | 3/2011 | Amaratunga et al. | |
| 2011/0051820 A1 | 3/2011 | Fornage | |
| 2011/0130889 A1 | 6/2011 | Khajehoddin et al. | |
| 2011/0221375 A1* | 9/2011 | Suzuki | B62D 5/046 318/496 |
| 2011/0261601 A1 | 10/2011 | Chapman et al. | |
| 2012/0087158 A1 | 4/2012 | Chapman et al. | |
| 2013/0009674 A1* | 1/2013 | Reese | H03K 3/0315 327/109 |
| 2013/0026955 A1* | 1/2013 | Kikunaga | H02P 27/085 318/51 |
| 2014/0191583 A1* | 7/2014 | Chisenga | H02J 1/10 307/82 |

FOREIGN PATENT DOCUMENTS

| | | |
|---|---|---|
| CA | 2693737 A1 | 8/2010 |
| DE | 20012131 U1 | 3/2001 |
| EP | 1794799 A1 | 6/2007 |
| EP | 1803161 A1 | 7/2007 |
| EP | 1837985 A2 | 9/2007 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| NL | 1021582 C2 | 4/2004 |
| NL | 1021591 C2 | 4/2004 |
| WO | 2004008619 A2 | 1/2004 |
| WO | 2004100348 A1 | 11/2004 |
| WO | 2004100348 A8 | 12/2005 |
| WO | 2006048688 A1 | 5/2006 |
| WO | 2007080429 A2 | 7/2007 |
| WO | 2009081205 A2 | 7/2009 |
| WO | 2009081205 A3 | 10/2009 |
| WO | 2009134756 A1 | 11/2009 |

OTHER PUBLICATIONS

International Search Report and Written Opinion, Application No. PCT/US2014/023376, dated Jun. 17, 2014, 11 pages.
Ando et al., "Development of Single Phase UPS Having AC Chopper and Active Filter Ability," IEEE International Conference on Industrial Technology, 10.1109/ICIT.2006.372445, pp. 1498-1503, 2006.
Biel et al., "Sliding-Mode Control Design of a Boost-Buck Switching Converter for AC Signal Generation," vol. 51, issue 8, pp. 1539-1551, 2004.
Biel et al., "Sliding-Mode Control of a Single-Phase AC/DC/AC Converter," Proceedings of the 40th IEEE Conference on Decision and Control, vol. 1., pp. 903-907, Dec. 2001.
Bose et al., "Electrolytic Capacitor Elimination in Power Electronic System by High Frequency Filter," Conference Record of the 1991 IEEE Industry Applications Society Annual Meeting, vol. 1, pp. 869-878, 1991.
Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.
Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.
Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.
Brekken, "Utility-Connected Power Converter for Maximizing Power Transfer From a Photovoltaic Source," Thesis Submitted to the Faculty of the Graduate School of the University of Minnesota, Jun. 2002, 56 pages.
Bush, "UK Solar Firm Discloses Novel Inverter Topology," ElectronicsWeekly.com. Apr. 2011, last accessed Aug. 30, 2011 at http://www.electronicsweekly.com/Articles/2011/O4/26/50953/ UK-solar-firm-discloses-novel-inverter-topology.htm.
Chang et al., "The Impact of Switching Strategies on Power Quality for Integral Cycle Controllers," IEEE Transactions on Power Delivery, vol. 18, No. 3, pp. 1073-1078, Jul. 2003.
Chisenga, "Development of a Low Power Photovoltaic Inverter for Connection to the Utility Grid," PhD Thesis, Fitzwilliam College, Cambridge, 173 pages, 2007.
Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.
Edelmoser, "Improved Solar Inverter With Wide Input Voltage Range," IEEE 10th Mediterranean Conference, MEleCon 2000, vol. 2, pp. 810-813, 2000.
Enphase Energy, "Application Note: Multi-Tenant Design Guidelines," rev. 1, 5 pages, 2008.
Enphase Energy, "Enphase Field Wiring Diagram—M190 & M210 Microinverters—240v, Single Phase," Drawing No. 144-00001, rev. 6, 1 page, 2009.
Enphase Energy, "Enphase Micro-Inverter Technical Data," Doc. No. 142-00004, rev. 2, 2 pages, 2008.
Esram et al., "Comparison of Photovoltaic Array Maximum Power Point Tracking Techniques," IEEE Transactions on Energy Conversion, vol. 22, No. 2, pp. 439-449, Jun. 2007.
Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.
Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.
Hung et al., "Analysis and Implementation of a Delay-compensated Deadbeat Current Controller for Solar Inverters," IEEE Proceedings—Circuits, Devices and Systems, pp. 279-286, 2001.

(56) References Cited

OTHER PUBLICATIONS

Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC '09, pp. 1813-1818, 2009.
Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.
Jeong et al., "An Improved Method for Anti-Islanding by Reactive Power Control," pp. 965-970, 2005.
Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.
Jung et al., "High-frequency DC Link Inverter For Grid-Connected Photovoltaic System," Conference Record of the Twenty-Ninth IEEE Photovoltaic Specialists Conference, pp. 1410-1413, 2002.
Kern, "SunSine300: Manufacture of an AC Photovoltaic Module, Final Report, Phases I & II, Jul. 25, 1995-Jun. 30, 1998," NREL/SR-520-26085, 1999, 32 pages.
Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.
Khajehoddin et al., "A Novel Topology and Control Strategy for Maximum Power Point Trackers and Multi-string Grid-connected PV Inverters," Applied Power Electronics Conference, APECO8, pp. 173-178, 2008.
Khajehoddin et al., "A Robust Power Decoupler and Maximum Power Point Tracker Topology for a Grid-Connected Photovoltaic System," IEEE Power Electronics Specialists Conference, PESCO8, pp. 66-69, 2008.
Kim et al., "New Control Scheme for AC-DC-AC Converter Without DC Link Electrolytic Capacitor," 24th Annual IEEE Power Electronics Specialists Conference, PESC '93 Record., pp. 300-306, 1993.
Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.
Kern, "Inverter Technology for the Solar Industry," Siemens Energy & Automation, 2009, 20 pages.
Curran, "Grid-Connected Solar Microinverter Reference Design," Microchip Technology Incorporated, 2010, 31 pages.
Nikraz et al., "Digital Control of a Voltage Source Inverter in Photovoltaic Applications," 35th Annual IEEE Power Electronics Specialists Conference, pp. 3266-3271, 2004.
Oldenkamp et al., "AC Modules: Past, Present and Future, Workshop Installing the Solar Solution," Jan. 1998, Hatfield, UK, 6 pages.
Pajic et al., "Unity Power Factor Compensation for Burst Modulated Loads," IEEE Power Engineering Society General Meeting, vol. 2, pp. 1274-1277, 2003.
Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.
Rodriguez et al., "Analytic Solution to the Photovoltaic Maximum Power Point Problem," IEEE Transactions on Circuits and Systems, vol. 54, No. 9, pp. 2054-2060, Sep. 2007.
Rodriguez et al., "Dynamic Stability of Grid-Connected Photovoltaic Systems," Power Engineering Society General Meeting, vol. 2, pp. 2193-2199, 2004.
Rodriguez et al., "Long-Lifetime Power Inverter for Photovoltaic AC Modules," IEEE Transaction on Industrial Electronics, vol. 55, No. 7, pp. 2593-2601, Jul. 2008.
Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.
Russell et al., "SunSine300 AC Module, Annual Report Jul. 25, 1995-Dec. 31, 1996," NREL/SR-520-23432, UC Category 1280, 1997, 31 pages.
Schmidt et al., "Control of an Optimized Converter for Modular Solar Power Generation," 20th International Conference on Industrial Electronics, Control and Instrumentation, vol. 1, pp. 479-484, 1994.
Schutten et al., "Characteristics of Load Resonant Converters Operated in a High-Power Factor Mode," IEEE, Trans. Power Electronics, vol. 7, No. 2, pp. 5-16, 1991.
Sen et al., "A New DC-TO-AC Inverter With Dynamic Robust Performance," 1998 IEEE Region 10 International Conference on Global Connectivity in Energy, Computer, Communication and Control, vol. 2, pp. 387-390, 1998.
Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.
Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.
Strong et al., "Development of Standardized, Low-Cost AC PV Systems—Phase I Annual Report," NREL/SR-520-23002, Jun. 1997, 18 pages.
Strong et al., "Development of Standardized, Low-Cost AC PV Systems—Final Technical Report," NREL/SR-520-26084, Feb. 1999, 27 pages.
Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.
Takahashi et al., "Development of Long Life Three Phase Uninterruptible Power Supply Using Flywheel Energy Storage Unit," Proc. Int'l. Conf. Power Electronics, vol. 1, pp. 559-564, 1996.
Takahashi et al., "Electrolytic Capacitor-Less PWM Inverter," in Proceedings of the IPEC '90, Tokyo, Japan, pp. 131-138, Apr. 2-6, 1990.
Thomas et al., "Design and Performance of Active Power Filters," IEEE IAS Magazine, 9 pages, 1998.
Tian, "Solar-Based Single-Stage High-Efficiency Grid-Connected Inverter," Masters Thesis, University of Central Florida, Orlando, 83 pages, 2005.
Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.
Wada et al., "Reduction Methods of Conducted EMI Noise on Parallel Operation for AC Module Inverters," 2007 IEEE Power Electronics Specialists Conference, pp. 3016-3021, Jun. 2007.
Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.
Wu, et al., "A 1φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.
Wu, et al., "A 1φ 3W Grid-Connection PV Power Inverter with Partial Active Power Filter," IEEE Transactions on Aerospace and Electronic Systems, vol. 39, No. 2, pp. 635-646, Apr. 2003.
Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.
Xue et al., "Topologies of Single-Phase Inverters for Small Distributed Power Generators: An Overview," IEEE Transactions on Power Electronics, vol. 19, No. 5, pp. 1305-1314, 2004.
Kjaer et al., "A Novel Single-Stage Inverter for the AC-module with Reduced Low-Frequency Ripple Penetration," EPE 2003, ISBN 90-75815-07-7, 10 pages, 2003.
Kjaer et al., "A Review of Single-phase Grid-connected Inverters for Photovoltaic Modules," IEEE Trans on Power Electronics, vol. 41, No. 5, pp. 1292-1306, 2005.

(56) References Cited

OTHER PUBLICATIONS

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power Inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

Kjaer, "Selection of Topologies for the PHOTOENERGYTM Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

Kutkut, "PV Energy Conversion and System Integration," Florida Energy Systems Consortium, 2009, 24 pages.

Kwon et al., "High-efficiency Module-integrated Photovoltaic Power Conditioning System," IET Power Electronics, doi:10.1049/iet-pel. 2008.0023, 2008.

Lohner et al., "A New Panel-integratable Inverter Concept for Grid-Connected Photovoltaic Systems," IEEE ISIE '96, vol. 2, pp. 827-831, 1996.

Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

Martins et al., "Interconnection of a Photovoltaic Panels Array to a Single-Phase Utility Line From a Static Conversion System," Proc. IEEE Power Electronics Specialists Conf., pp. 1207-1211, 2000.

Martins et al., "Usage of the Solar Energy from the Photovoltaic Panels for the Generation of Electrical Energy," The 21st International Telecommunication Energy Conference, 6 pages, 1999.

Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Boost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

International Search Report and Written Opinion for Application No. PCT/US2011/055685, dated Apr. 3, 2012, 14 pages.

Ferriera, et al. "Powerline Communications: Theory and Applications for Narrowband and Broadband Communications over Power Lines," Aug. 2010, Chapter 2, 120 pages.

Ferriera, et al. "Powerline Communications: Theory and Applications for Narrowband and Broadband Communications over Power Lines," Aug. 2010, Chapter 4, 48 pages.

Ferriera, et al. "Powerline Communications: Theory and Applications for Narrowband and Broadband Communications over Power Lines," Aug. 2010, Chapter 5, 116 pages.

U.S. Appl. No. 13/538,723 by Rothblum, et al., "Device, System, and Method for Communicating with a Power Inverter Using Power Line Communications," filed Jun. 29, 2012, 45 pages.

\* cited by examiner

INVERTER COMMUNICATIONS USING OUTPUT SIGNAL

The present application claims priority under 35 U.S.C. §119(e) to U.S. Provisional Patent Application Ser. No. 61/801,835, entitled "INVERTER COMMUNICATIONS USING OUTPUT SIGNAL" by Patrick Chapman, which was filed on Mar. 15, 2013, the entirety of which is incorporated herein by reference.

GOVERNMENT RIGHTS

This invention was made in part with government support under Grant No. DE-EE0005341 awarded by the Department of Energy. The Government has certain rights in this invention.

BACKGROUND

Power inverters convert a DC power to an AC power. For example, some power inverters are configured to convert the DC power to an AC power suitable for supplying energy to an AC grid and, in some cases, an AC load coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency.

In an effort to increase the amount of AC power generated, a large number of power inverters may be used in a particular application. In some implementations, each power inverter is incorporated or otherwise associated with an alternative energy source to form an alternative energy source module. Such modules are typically located in remote or otherwise difficult to reach location (e.g., a solar cell panel located on a roof). As such, communicating with and/or controlling the inverters may be accomplished remotely.

Power line carrier communication is one type of technique typically used to facilitate communications with individual inverters. In power line carrier communication techniques, the output power line cables connected to each inverter are used as the physical communication substrate. As such, a separate communication substrate or interconnect is not required. However, power line carrier communication can significantly increase the cost of the inverter and be difficult to integrate with other components of the inverter. Additionally, power line carrier communication can be sensitive to power line noise and line impedance. Further, transferring large amounts of data to the inverters, such as a firmware update, using power line carrier communication can be difficult and time consuming.

SUMMARY

According to one aspect of the disclosure, a method for communicating information from an inverter configured for the conversion of direct current (DC) power generated from an alternative source to alternating current (AC) power is disclosed. The method includes determining, in the inverter, information to be transmitted from the inverter to a device remote from the inverter over a power line cable connected to the inverter; and generating, in the inverter, a plurality of pulse width modulation signals to control operation of an output converter of the inverter as a function of the information to be transmitted. The plurality of pulse width modulation signals cause the output converter to generate an output waveform having the information modulated thereon.

In some embodiments, generating the plurality of pulse width modulation signals may include modulating the information to be transmitted on a modulation signal of the output waveform. In some embodiments, the plurality of pulse width modulation signals may cause the output converter to generate an output waveform having a carrier signal, the modulation signal, and the information to be transmitted may be modulated on the modulation signal. In some embodiments, the inverter may be coupled to a power grid to provide an amount of power to the power grid, and the modulation signal may have a frequency equal to a frequency of the power grid.

Additionally, in some embodiments, generating the plurality of pulse width modulation signals may include modulating the information to be transmitted on a carrier signal of the output waveform. In some embodiments, modulating the information to be transmitted on the carrier signal may include shifting the frequency of the carrier signal. In some embodiments, shifting the frequency of the carrier signal may include shifting the frequency by an amount of less than one percent of the original frequency of the carrier signal. In some embodiments, shifting the frequency may include shifting the frequency by a first amount less than an original frequency of the carrier signal and shifting the frequency by a second amount greater than the original frequency of the carrier signal.

In some embodiments, modulating the information may include modulating first information to be transmitted from a first inverter on the carrier signal by shifting the frequency of the carrier signal by a first amount; and may further include modulating second information to be transmitted from a second inverter on the carrier signal by shifting the frequency of the carrier signal by a second amount different from the first amount. In some embodiments, the plurality of pulse width modulation signals may cause the output converter to generate an output waveform having the carrier signal, a modulation signal, and the information to be transmitted modulated on the carrier signal.

In some embodiments, the method may further include detecting whether the inverter has been disconnected from a power grid, detecting whether a maintenance tool has been communicatively coupled to the power line cable, and communicating with the maintenance tool using a data transfer rate higher than a data transfer rate of the output waveform having the information modulated thereon. In some embodiments, the method may include discontinuing a power output to the power line cable of the inverter in response to determining that the inverter has been disconnected from the power grid. Additionally, in some embodiments, the method may further include detecting the information modulated on the output waveform using a current sensor coupled to the power line cable.

In some embodiments, the method may include demodulating the information from a modulation signal of the output waveform. In some embodiments, the method may include demodulating the information from a carrier signal of the output waveform. Additionally, in some embodiments, the demodulating the information may include demodulating binary information.

According to another aspect, a system for communicating information over a power line cable is disclosed. The system includes an inverter including an input converter to receive a direct current (DC) power input from a solar panel, an output converter coupled to a power line cable to supply an AC power output of the inverter to a power grid, and an inverter controller to control operation of the input converter and the output converter. The inverter controller is to determine information to be transmitted from the inverter over the power line cable and control operation of the output converter to modulate the information on one of a modulation signal or a carrier signal of an output waveform generated by the output converter.

In some embodiments, the output waveform may include the modulation signal, the carrier signal, and the information to be transmitted modulated on one of the modulation signal or the carrier signal. In some embodiments, the modulation signal may have a frequency equal to a frequency of the power grid. In some embodiments, the inverter controller may modulate the information on the carrier signal by shifting the frequency of the carrier signal.

In some embodiments, the inverter controller may shift the frequency of the carrier signal by an amount of less than one percent of the original frequency of the carrier signal. In some embodiments, the inverter controller may shift the frequency of the carrier signal by a first amount less than an original frequency of the carrier signal and shift the frequency by a second amount greater than the original frequency of the carrier signal.

In some embodiments, the inverter may include a first inverter having a first output converter and a first inverter controller. The first inverter controller may determine first information to be transmitted from the first inverter over the power line cable and control operation of the first output converter to shift the carrier frequency by a first amount to modulate a first information on the carrier signal, and may further include a second inverter. The second inverter may include an second input converter to receive a direct current (DC) power input from a second solar panel, a second output converter coupled to the power line cable to supply an AC power output of the second inverter to the power grid, and an inverter controller to control operation of the second input converter and the second output converter. The second inverter controller may determine second information to be transmitted from the second inverter over the power line cable and control operation of the second output converter to shift the carrier frequency by a second amount different from the first amount to modulate a second information on the carrier signal.

In some embodiments, the system may include a maintenance tool communicatively couplable to the power line cable. The inverter controller may detect whether the inverter has been disconnected from the power grid, detect whether the maintenance tool has been communicatively coupled to the power line cable, and communicate with the maintenance tool using a data transfer rate higher than a data transfer rate of the output waveform having the information modulated thereon.

In some embodiments, the inverter controller may control the output converter to discontinue the AC power output in response to a determination that the inverter has been disconnected from the power grid.

In some embodiments, the system may include a current sensor coupled to the power line cable to detect the information modulated on the output waveform.

In some embodiments, the system may further include an inverter array gateway communicatively coupled to the current sensor and comprising a demodulator to demodulate the information from the one of the modulation signal or the carrier signal.

According to another aspect, one or more media having stored thereon instructions, which when executed by an inverter controller of an inverter, causes the inverter controller to determine information to be transmitted from the inverter to a device remote from the inverter over a power line cable connected to the inverter and generate a plurality of pulse width modulation signals to control operation of an output converter of the inverter as a function of the information to be transmitted. The plurality of pulse width modulation signals cause the output converter to generate an output waveform having the information modulated thereon.

In some embodiments, to generate the plurality of pulse width modulation signals may include to modulate the information to be transmitted on a modulation signal of the output waveform. In some embodiments, the plurality of pulse width modulation signals may cause the output converter to generate an output waveform having a carrier signal, the modulation signal, and the information to be transmitted modulated on the modulation signal.

In some embodiments, the modulation signal may have a frequency equal to a frequency of a power grid to which the inverter is coupled. In some embodiments, to generate the plurality of pulse width modulation signals may include to modulate the information to be transmitted on a carrier signal of the output waveform.

In some embodiments, to modulate the information to be transmitted on the carrier signal may include to shift the frequency of the carrier signal. In some embodiments, to shift the frequency of the carrier signal may include to shift the frequency by an amount of less than one percent of the original frequency of the carrier signal.

In some embodiments, to shift the frequency may include to shift the frequency by a first amount less than an original frequency of the carrier signal and to shift the frequency by a second amount greater than the original frequency of the carrier signal.

Additionally, in some embodiments, to modulate the information may include to modulate first information to be transmitted from a first inverter on the carrier signal by shifting the frequency of the carrier signal by a first amount, and the plurality of instructions may further cause the inverter controller to modulate second information to be transmitted from a second inverter on the carrier signal by shifting the frequency of the carrier signal by a second amount different from the first amount.

In some embodiments, the plurality of pulse width modulation signals may cause the output converter to generate an output waveform having the carrier signal, a modulation signal, and the information to be transmitted modulated on the carrier signal. In some embodiments, the plurality of instructions may further cause the inverter controller to detect whether the inverter has been disconnected from a power grid, detect whether a maintenance tool has been communicatively coupled to the power line cable, and communicate with the maintenance tool using a data transfer rate higher than a data transfer rate of the output waveform having the information modulated thereon.

In some embodiments, the plurality of instructions may further cause the inverter controller to discontinue a power output to the power line cable of the inverter in response to a determination that the inverter has been disconnected from the power grid.

In some embodiments, the plurality of instructions may further cause the inverter controller to detect the information modulated on the output waveform using a current sensor coupled to the power line cable. Additionally, In some embodiments, the plurality of instructions may further cause the inverter controller to demodulate the information from a modulation signal of the output waveform.

In some embodiments, the plurality of instructions further may cause the inverter controller to demodulate the information from a carrier signal of the output waveform. Additionally, in some embodiments, to demodulate the information may include to demodulate binary information.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
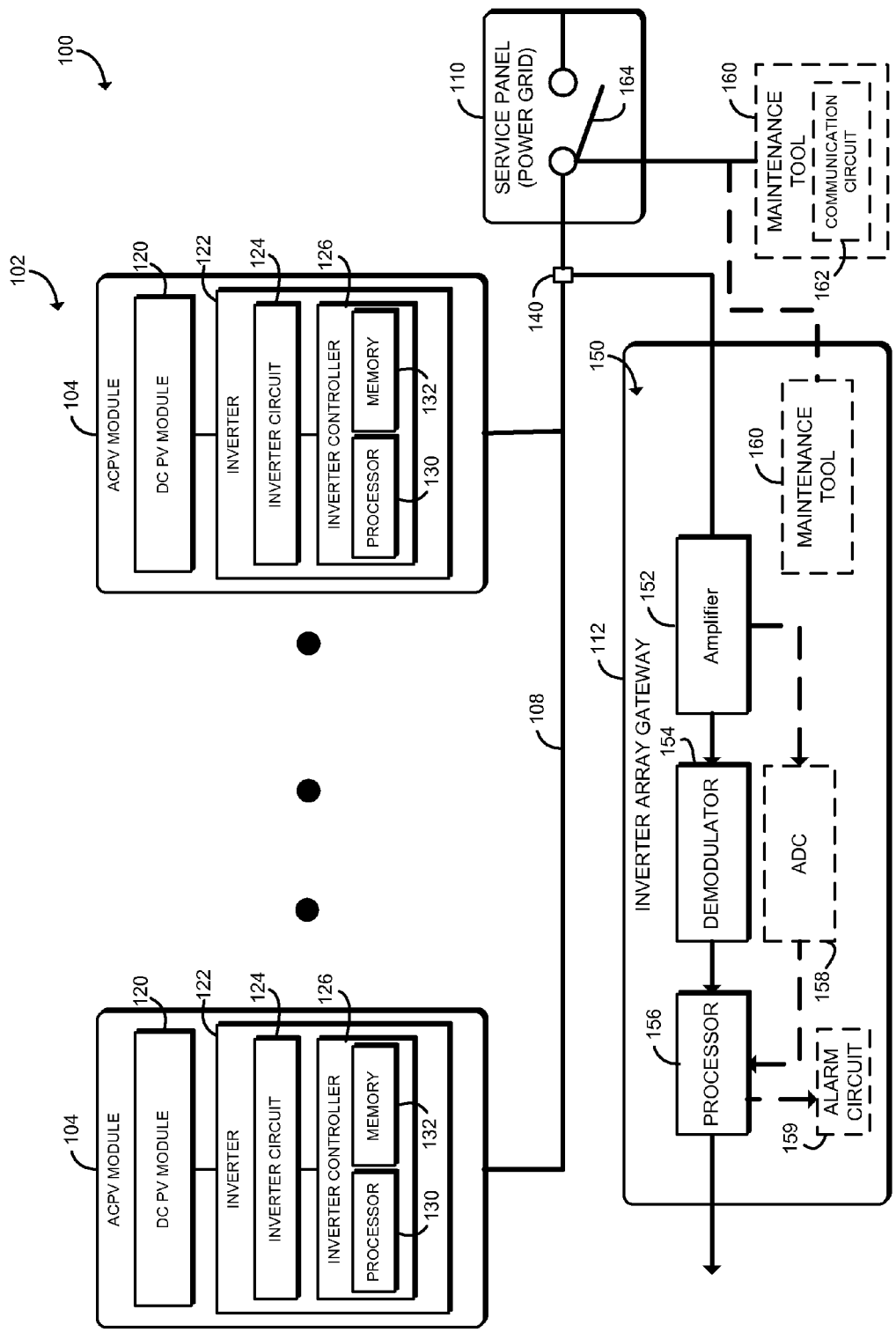
FIG. 1 is a simplified block diagram of at least one embodiment a system for generating alternative energy.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for generating alternative energy includes an array 102 of alternative energy source modules 104 and an inverter array gateway 112 electrically coupled to each alternative energy source modules 104 via an alternating current ("AC") power line cable 108. The alternative energy source modules 104 are configured to convert direct current ("DC") power from an alternative energy source (e.g., a photovoltaic module) to AC power, which is supplied to a power grid via a service panel 110 and the power line cable 108. In the illustrative embodiment, the alternative energy source modules 104 are embodied as photovoltaic modules configured to convert solar energy to AC power. However, in other embodiments, other types of alternative energy sources may be used such as, for example, fuel cells, DC wind turbines, DC water turbines, and/or other alternative energy sources. Additionally, although the illustrative array 102 includes two alternative energy source modules 104, the array 102 may include more or fewer modules 104 in other embodiments.

The inverter array gateway 112 provides a communication portal to the inverters modules 104 of the array 102. In use, each of the alternative energy source modules 104 is configured to communicate with the inverter array gateway 112 and/or other devices via the gateway 112. To do so, as discussed in more detail below, the alternative energy source modules 104 modulate information to be transmitted onto the output waveform (i.e., current and/or voltage waveform) generated by each module 104. For example, such modulation may include modulating information onto a modulation signal and/or a carrier signal of the output waveform as discussed below. It should be appreciated that because the output waveform of the modules 104 is used for such communications, additional communication circuitry (e.g., a power line carrier communication circuit) is not required in the modules 104.

As discussed above, in the illustrative embodiment, the alternative energy source modules 104 are embodied as photovoltaic modules. As such, each of the alternative energy source modules includes a DC photovoltaic module 120 and an inverter 122. The DC photovoltaic module 120 may be embodied as one or more photovoltaic cells and is configured to deliver DC power to the inverter 122 in response to receiving an amount of sunlight. Of course, the magnitude of the DC power delivered by DC photovoltaic module 120 is a function of environmental variables, such as, e.g., sunlight intensity, sunlight angle of incidence and temperature. The inverter 122 is configured to convert the DC power generated by the DC photovoltaic module 120 to AC power. In some embodiments, the inverter 122 and the DC photovoltaic module 120 are located in a common housing. Alternatively, the inverter 122 may include its own housing secured to the housing of the DC photovoltaic module 120. Additionally, in some embodiments, the inverter 122 is separate from the housing of the DC photovoltaic module 120, but located nearby.

Each of the illustrative inverters 122 includes a DC-to-AC inverter circuit 124 and an inverter controller 126. The DC-to-AC inverter circuit 124 is configured to convert the DC power generated by the DC photovoltaic module 120 to AC power at a frequency of a power grid ("grid frequency") to which the array 102 is coupled via the service panel 110. The operation of the inverter 122 is controlled and monitored by the inverter controller 126. The illustrative inverter controller 126 includes a processor 130 and a memory 132. Additionally, the inverter controller 126 may include other devices commonly found in controllers, which are not illustrated in FIG. 1 for clarity of description. Such additional devices may include, for example, peripheral devices, data storage devices, input/output ports, and/or other devices.

The processor 130 of the inverter controller 126 may be embodied as any type of processor capable of performing the functions described herein including, but not limited to a microprocessor, digital signal processor, microcontroller, or the like. The processor 130 is illustratively embodied as a single core processor, but may be embodied as a multi-core processor having multiple processor cores in other embodiments. Additionally, the inverter controller 126 may include additional processors 130 having one or more processor cores in other embodiments.

The memory 132 of the inverter controller 126 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. The memory 132 is communicatively coupled to the processor 130 via a number of signal paths, such as a data bus, point-to-point connections, or other interconnects. Although only a single memory device 132 is illustrated in FIG. 1, in other embodiments, the inverter controller 126 may include additional memory devices.

The inverter array gateway 112 includes a demodulation circuit 150 configured to demodulate the information transmitted by the modules 104 over the power line cable 108. In the illustrative embodiment, the demodulation circuit 150 includes an amplifier 152, which receives a sensor signal from a current sensor 140 coupled to the power line cable 108. The amplifier 152 amplifies and conditions the sensor signal, which is subsequently provided to a demodulator 154. The demodulator 154 demodulates the information from the sensor signal and provides the demodulated information to the processor 156, which may subsequently save the information in a local or remote data storage, transmit the information to a remote device (e.g., a remote monitor computer), generate local or remote alarms (e.g., alarm circuit 159), or take some other action in response to the information. The processor 156 may be embodied as any type of processor capable of performing the functions described herein including, but not limited to a microprocessor, digital signal processor, microcontroller, or the like. Depending on the type of modulation used by the alternative energy source modules 104, the demodulation circuit 150 may include an analog-to-digital converter 158 in addition to, or in place of, the demodulator 154. Regardless, each of the demodulator 154 and the analog-to-digital converter 158 are configured to supply the demodulated information to the processor 156.

In some embodiments, the system 100 may also include a maintenance tool 160, which may be utilized by an installer, repairer, or other maintenance personnel of the alternative energy source modules 104. Similar to the inverter array gateway 112, the maintenance tool 160 is configured to communicate with the alternative energy source modules 104. However, when the maintenance tool 160 is coupled to the power line cable 108, a switch 164 of the service panel 110 may be opened to decouple the array 102 from the power grid. In such embodiments, the alternative energy source modules 104 may discontinue the generation of AC output power (e.g., automatically by detecting an islanding condition or in response to receipt of an instruction signal transmitted by the maintenance tool 160). As such, the maintenance tool 160 and the alternative energy source modules 104 may utilize the power line cable 108 solely for communication purposes (i.e., not for delivery of power as normal) while the array 102 is disconnected from the power grid. In such circumstances, a communication protocol having a higher data transfer rate, relative to communication techniques using the power line cable 108 while AC output power is being supplied, may be used (e.g., a Modbus® protocol). The maintenance tool 160 includes a communication circuit 162 to support such "off-line" communications with the modules 104. The communication circuit 162 may include various circuits and/or components to facilitate the off-line communications and associated communication protocol.

In some embodiments, the maintenance tool 160 may be embodied in, or otherwise incorporated into, the inverter array gateway 112 as shown in FIG. 1. In such embodiments, the maintenance tool 160 (i.e., the inverter array gateway 112) may be communicatively coupled to the switch 164 of the service panel 110 to selectively control the operation thereof. To do so, an installer or technician may operate the inverter array gateway 112 to selectively control the state of the switch 164 to thereby couple or decouple the array 102 from the power grid. For example, in some embodiments, the inverter array gateway 112 may include a user interface (e.g., a touchscreen or other interface) to facilitate such control of the switch 164 and communication with the array 102. Additionally or alternatively, the inverter array gateway 112 may include communication circuitry to facilitate communications with the maintenance tool 160 to control operation thereof.

In other embodiments, the maintenance tool 160 may be embodied as an auxiliary tool connectable to a communication device. For example, in some embodiments, the maintenance tool 160 is embodied as an auxiliary control device connectable to a mobile communication device such as a smartphone, tablet computer, notebook, laptop, or other mobile computing and/or communication device. In such embodiments, the maintenance tool 160 may utilize the attached communication device to communicate with the inverter array gateway 112 (or with a corresponding client maintenance tool 160) to control operation of the switch 164 and/or communicate with the array 102 as discussed above.

Figure 2:
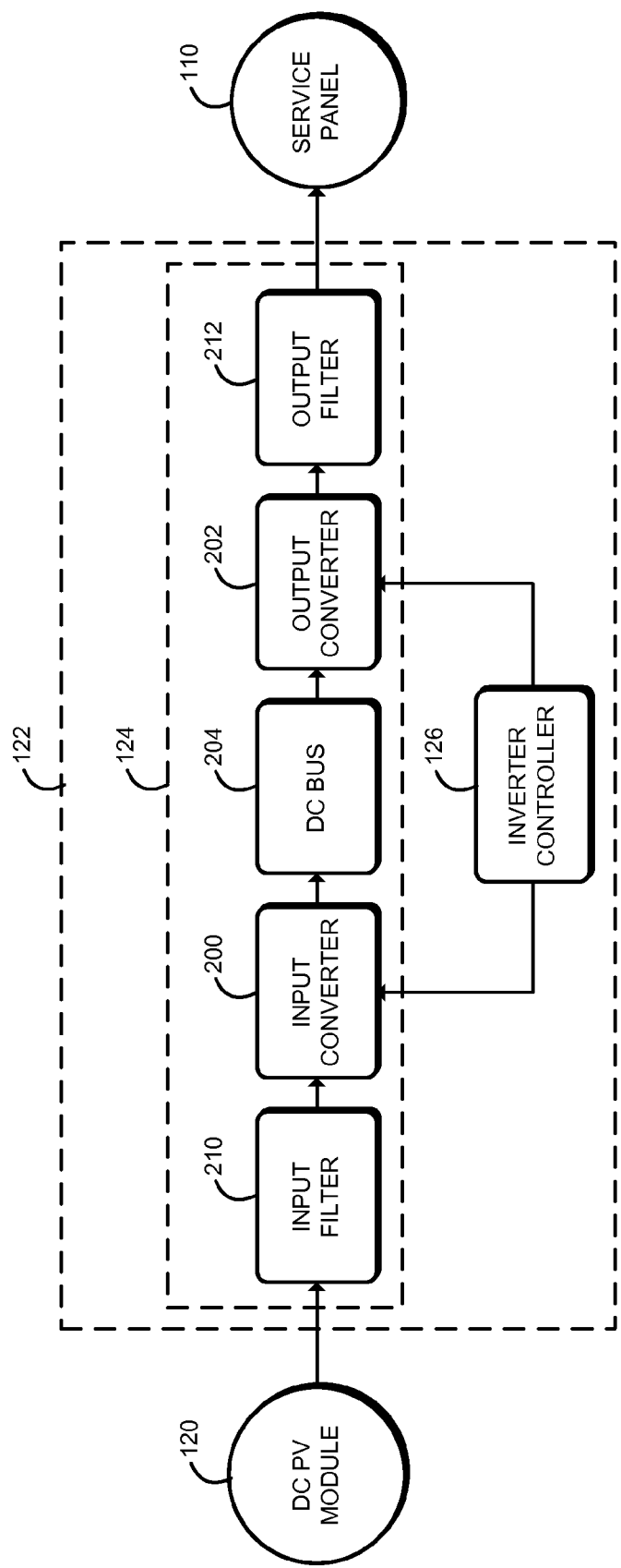
FIG. 2 is a simplified block diagram of at least one embodiment of an inverter of the system of FIG. 1.

Referring now to FIG. 2, in the illustrative embodiment, the inverter circuit 124 of the inverter 122 includes an input converter 200 electrically coupled to a DC bus 204 and an output converter 202 electrically coupled to the DC bus 204. Additionally, in some embodiments, the inverter circuit 124 may also include an input filter circuit 210 electrically coupled to the input converter 200 and the DC photovoltaic module 120 and an output filter circuit 212 electrically coupled to the output converter 202 and the service panel 110 (i.e., the power grid).

In the illustrative embodiment, the input converter 200 is embodied as a DC-to-DC converter configured to convert low voltage DC power to high voltage DC power. That is, the input converter 200 converts the DC power received from the DC photovoltaic module 120 to a high level DC voltage power, which is supplied to the DC bus 204. The output converter 202 is embodied as a DC-to-AC converter configured to convert the high voltage DC power from the DC bus 204 to AC power, which is supplied to the service panel 110, and thereby the power grid, at the grid frequency.

The inverter controller 126 is electrically coupled to the input converter 200 and configured to control the operation of the input converter 200 to convert the low voltage DC power received from the DC photovoltaic module 120 to the high voltage DC power supplied to the DC bus 204. Additionally, in some embodiments, the inverter controller 126 may control the operation of the input converter based on a maximum power point tracking ("MPPT") algorithm or methodology. To do so, the inverter controller 126 may provide a plurality of control signals to various circuits of the input converter 200.

The inverter controller 126 is also electrically coupled to the output converter 202 and configured to control operation of the output converter 202 to convert the DC power of the DC bus 204 to AC power suitable for delivery to the power grid via the service panel 110. Additionally, as discussed in more detail below in regard to FIG. 6, the inverter controller 126 is configured to control the operation of the output converter 202 so as to modulate information to be transmitted onto the output waveform of the inverter circuit 124. In particular, the inverter controller 126 may generate switch signals to control the operation of a plurality of switches of the output converter 202 to modulate information onto a modulation signal and/or a carrier signal of the output waveform.

Figure 3:
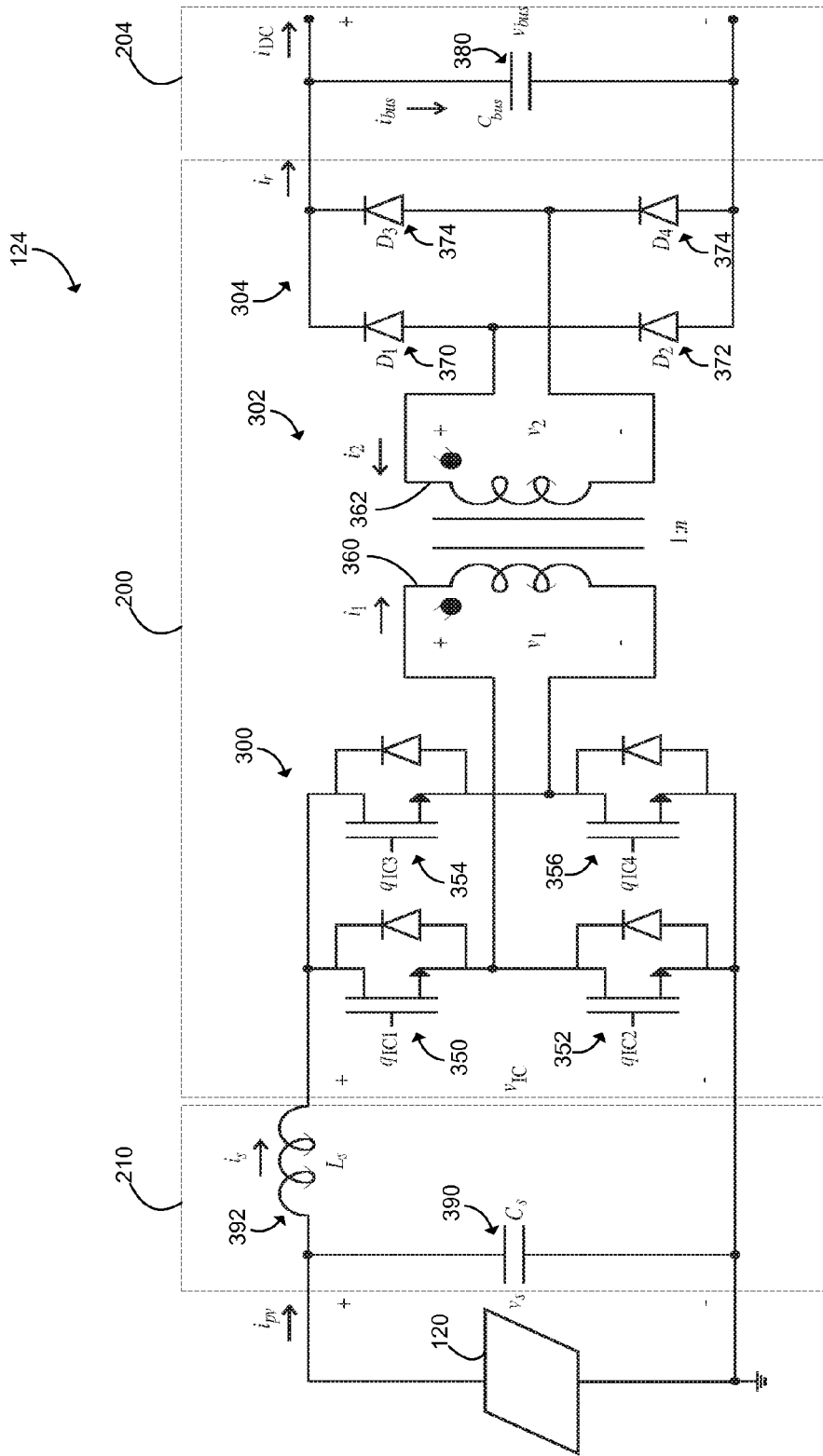
FIGS. 3 and 4 is a simplified circuit diagram of the inverter of FIG. 2.
Figure 4:
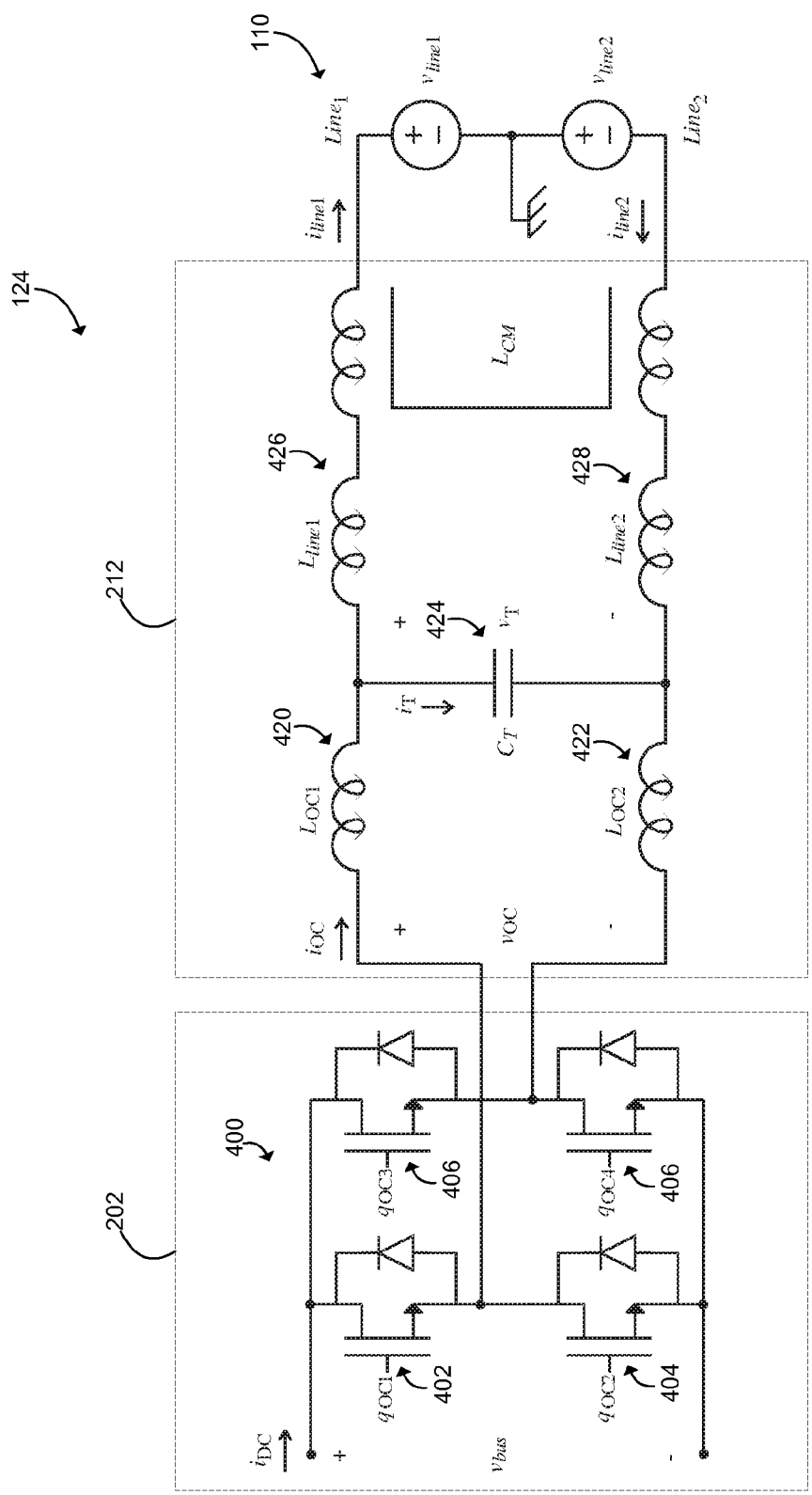

Referring now to FIGS. 3 and 4, in the illustrative embodiment, the input converter 200 includes an inverter circuit 300, a transformer 302, and a rectifier 304. The inverter circuit 300 is embodied as a DC-to-AC inverter circuit configured to convert the DC waveform supplied by the DC photovoltaic module 120 to an AC waveform delivered to a primary of the transformer 302. For example, the inverter circuit 300 is illustrative embodied as a bridge circuit formed by a plurality of switches 350, 352, 354, 356. Each of the switches 350, 352, 354, 356 are configured to receive a corresponding control signal, $q_{IC1}$, $q_{IC2}$, $q_{IC3}$, $q_{IC4}$, from the inverter controller 126 to control operation of the input circuit 300. The inverter controller 126 may use pulse width modulation (PWM), or other control technique, to control the switches 350, 352, 354, 356 at a relatively high switching frequency (e.g., at a frequency that is substantially higher than the AC grid frequency). As discussed above, the inverter circuit 300 converts the DC waveform from the DC photovoltaic module 120 to a first AC waveform based on the control signals received from the inverter controller 126. In the illustrative embodiment, the inverter circuit 300 is a embodied as a full-bridge circuit, but other circuit topologies such as a half-bridge circuit may be used in other embodiments. Additionally, although each of the switches 350, 352, 354, 356 is illustrated as MOSFET devices, other types of switches may be used in other embodiments.

The transformer 302 may be embodied as a two or more winding transformer having a primary winding electrically coupled to the inverter circuit 300 and a secondary winding coupled to the rectifier 304. The transformer 302 is configured to convert the first AC waveform supplied by the inverter circuit 300 at the primary winding to a second AC waveform at the secondary winding. The first and second AC waveforms may have substantially equal frequencies and may or may not have substantially equal voltages. The illustrative transformer 302 includes a primary winding 360 electrically coupled to the inverter circuit 300 and a secondary winding 362 electrically coupled to the rectifier circuit 304. The transformer 302 provides galvanic isolation between the primary side converter circuitry (including DC photovoltaic module 120) and the secondary side circuitry (including the DC bus 204). The turns ratio of the transformer 302 may also provide voltage and current transformation between the first AC waveform at the primary winding 360 and the second AC waveform at the secondary winding 362.

The rectifier circuit 304 is electrically coupled to the secondary winding 362 of the transformer 302 and is configured to rectify the second AC waveform to a DC waveform supplied to the DC bus 204. In the illustrative embodiment, the rectifier 304 is embodied as a full-bridge rectifier formed from a plurality of diodes 370, 372, 374, 376. Again, in other embodiments, other circuit topologies may be used in the rectifier circuit 304.

The DC bus 204 is coupled to the rectifier circuit 304 of the input converter 200 and to the output converter 202. The DC bus 204 is configured to store energy from the input converter 200 and transfer energy to the output converter 202 as needed. To do so, the DC bus 204 is maintained at a relatively high voltage DC value and includes a DC bus capacitor 380. The particular value of capacitance of the DC bus capacitor 380 may be dependent on the particular parameters of the inverter 122 such as the desired voltage level of the DC bus 204, the expected requirements of the power grid, and/or the like.

As shown in FIG. 4, the output converter 202 is electrically coupled to the DC bus 204 and configured to convert the DC bus waveform to the output AC waveform, which is filtered by the output filter 212. The output converter 202 includes a DC-to-AC inverter circuit 400 configured to convert the DC waveform supplied by the DC bus 204 to an AC waveform delivered to the output filter 212. For example, the inverter circuit 400 is illustrative embodied as a bridge circuit formed by a plurality of switches 402, 404, 406, 408. Each of the switches 402, 404, 406, 408 is configured to receive a corresponding control signal, $q_{OC1}$, $q_{OC2}$, $q_{OC3}$, $q_{OC4}$, from the inverter controller 126 to control operation of the output converter 202. As discussed above, the inverter controller 126 may use PWM to control the switches 402, 404, 406, 408 to generate a pulse width modulated AC waveform. Additionally, as discussed in more detail below, the inverter controller 126 may control the switches 402, 404, 406, 408 to modulate, or otherwise incorporate, information onto the AC waveform. It should be appreciated that although the illustrative the output converter 202 is embodied as a full-bridge circuit, other circuit topologies such as a half-bridge circuit may be used in other embodiments. Additionally, although each of the switches 402, 404, 406, 408 is illustrated as MOSFET devices, other types of switches may be used in other embodiments.

The input filter 210 and output filter 212 are configured to provide filtering functions of the DC input waveform from the DC photovoltaic module 120 and the AC output waveform to the power grid, respectively. The input filter 210 illustratively includes a filtering capacitor 390 and a filtering inductor 392. However, other filtering components and topologies may be used in other embodiments. The output filter 212 is configured to filter the output voltage by reducing the conducted interference and satisfying regulatory requirements. In the illustrative embodiment, the output filter 212 includes differential-mode inductors 420, 422, a line filter capacitor 424, and common-mode inductors 426, 428. Again, however, other filtering component and topologies may be used in other embodiments.

Figure 5:
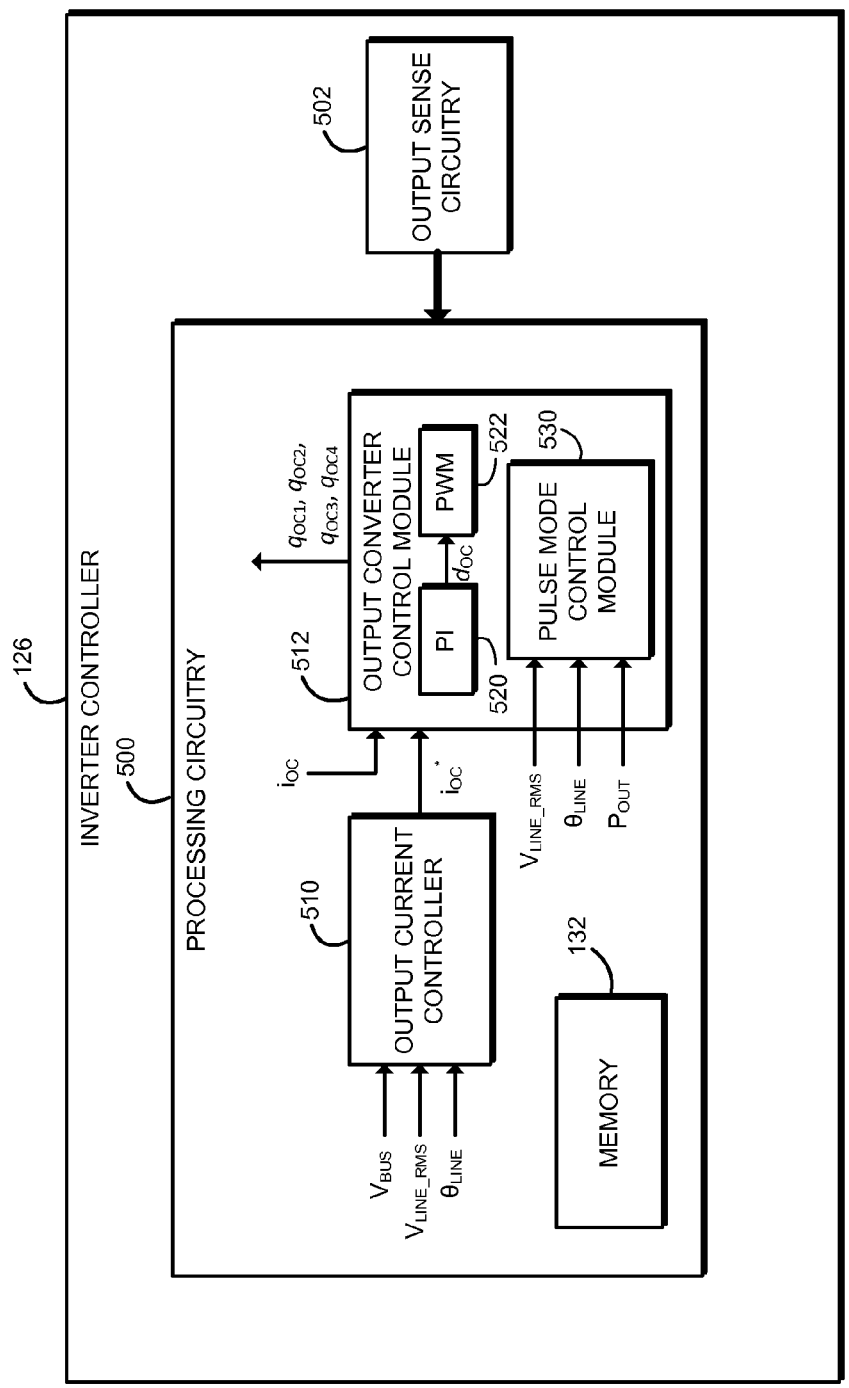
FIG. 5 is a simplified block diagram of at least one embodiment of an inverter controller of the inverter of FIG. 2.

Referring now to FIG. 5, the inverter controller 126 includes various control modules to control the operation of the input converter 200 and the output converter 202. With specific regard to the control of the output converter 202, the inverter controller 126 includes processing circuitry 500 and output sense circuitry 502, which provides various sensed signals to the processing circuitry 500. The processing circuitry 500 may be embodied in, or otherwise include, the processor 130 and/or the memory 132 of the inverter controller 126, as well as additional circuitry and/or devices. The output sense circuitry 502 includes a plurality of sensing circuits to sense various currents and/or voltages of the inverter 122 and/or power grid. In the illustrative embodiment, the output sense circuitry 502 is configured to sense or calculate the grid line voltage, $V_{LINE\_RMS}$, the grid phase, $\theta_{LINE}$, and the output power of the inverter 122, $P_{OUT}$. However, in other embodiments, additional or other currents, voltages, and/or circuit characteristics may be sensed or otherwise measured by the output sense circuitry 502.

The processing circuitry 500 includes a plurality of control modules, which may be embodied as firmware/software programs (e.g., stored in the memory 132), discrete hardware circuitry, and/or a combination of hardware and software. In the illustrative embodiment, the processing circuitry 500 includes an output current controller 510 and an output converter control module 512. Of course, it should be appreciated that additional or other modules, functionality, and features may be included in the processing circuitry 500 depending on the particular implementation. Additionally, it should be appreciated that although the modules 510, 512 are illustrated in FIG. 5 as separate modules, the functionality of any one or more of the modules 510, 512 may be incorporated into another module of the processing circuitry 500.

The output current controller 510 is configured to generate a command signal as a function of a plurality of other signals and/or characteristics of the inverter 122. For example, in the illustrative embodiment, the output current controller 510 generates a current command signal, $i_{OC}^*$, as a function of the voltage of the DC power bus 204, $V_{BUS}$, the average grid line voltage, $V_{LINE\_RMS}$, and the phase angle of the grid voltage, $\theta_{LINE}$. Of course, in other embodiments, the output current controller 510 may generate the current command signal based on additional or other signals of the inverter 122. Additionally, although the command signal is embodied as a current command signal in FIG. 5, the command signal may be embodied as a voltage command signal, a duty cycle command signal, or another type of command signal in other embodiments.

The output converter control module 512 is configured to control the operation of the output converter 202. To do so, the output converter control module 512 is configured to generate the plurality of output switching signals, $q_{OC1}$, $q_{OC2}$, $q_{OC3}$, $q_{OC4}$, that control the operation of the switches 402, 404, 406, 408 of the output converter 202. In the illustrative embodiment, the output converter control module 512 includes a proportional-integral (PI) module 520 that generates a duty cycle command signal, $d_{OC}$, based on the current command signal, $i_{OC}^*$, and a feedback signal of the output current of the inverter 122, $i_{OC}$. The duty cycle command signal, $d_{OC}$, is provided to a pulse width modulation (PWM) control module 522, which generates the output switching signals, $q_{OC1}$, $q_{OC2}$, $q_{OC3}$, $q_{OC4}$, based on the duty cycle command signal, $d_{OC}$. The output converter control module 512 may also perform various safety and/or quality verification checks on the inverter 122 such as ensuring that the output power remains within an acceptable range, protecting against anti-islanding conditions, and/or other functions.

The output converter control module 512 also includes the PWM control module 522, which is configured to control or operate the output converter 202 in a normal run mode via the generation of the output switching signals $q_{OC1}$, $q_{OC2}$, $q_{OC3}$, $q_{OC4}$. Additionally, when information is to be transmitted from the inverter 122, the PWM control module 522 is configured to adjust the output switching signals $q_{OC1}$, $q_{OC2}$, $q_{OC3}$, $q_{OC}$ so to modulate the information to be transmitted on the output power waveform as discussed in more detail below.

Figure 6:
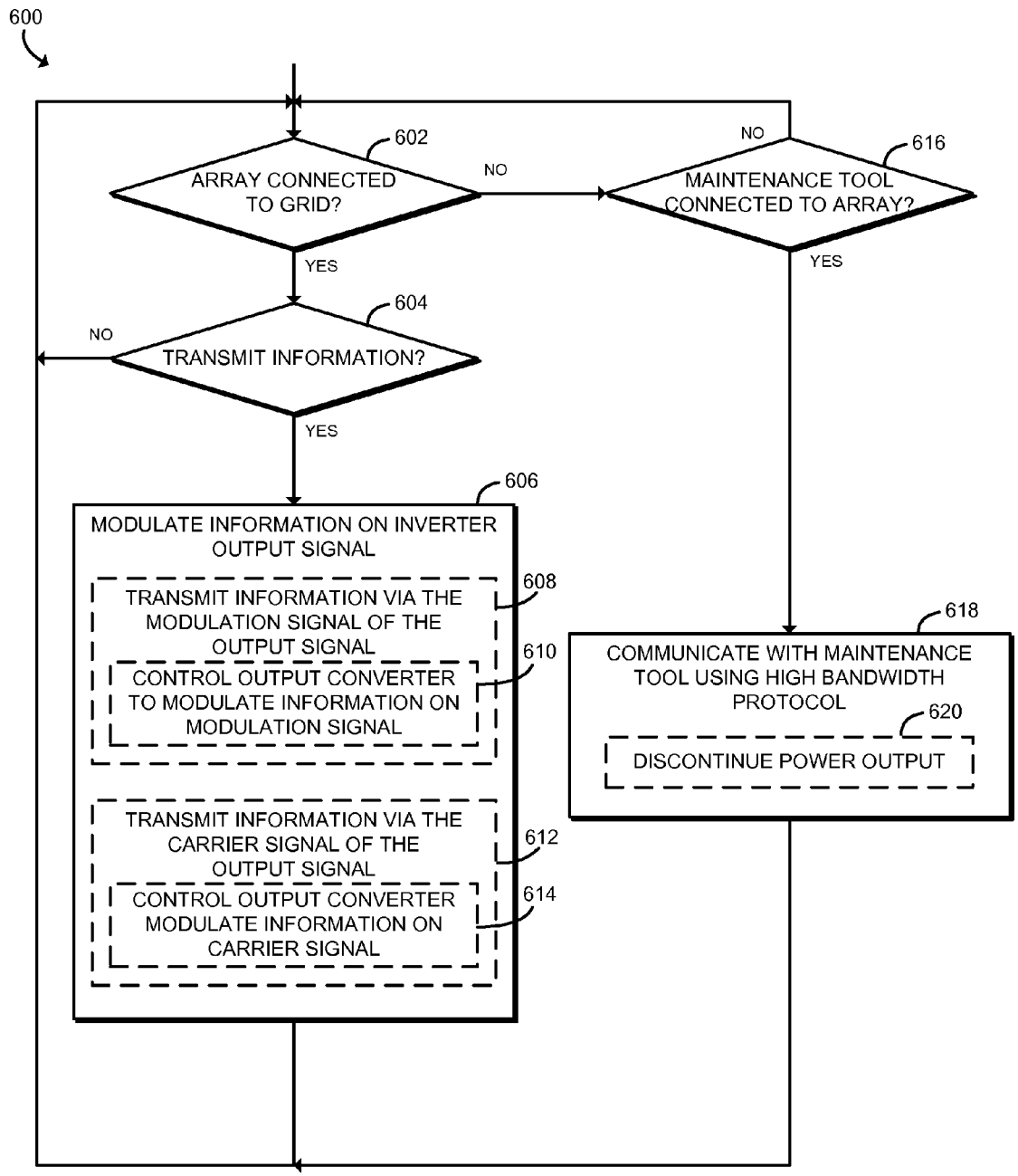
FIG. 6 is a simplified flow diagram of at least one embodiment of a method for communicating with the inverter of FIG. 2 using an output signal of the inverter.

Referring now to FIG. 6, in use, the inverter controller 126 of each inverter 122 may execute a method 600 for communicating information from the corresponding inverter 122. The method 600 begins with block 602 in which the inverter controller 126 determines whether the inverter 122 is connected to the power grid. To do so, the inverter controller 126 may, for example, utilize one or more various anti-islanding or similar techniques to determine whether the output of the inverter 122 is connected to the power grid. If the inverter controller 126 determines that the inverter 122 is connected to the power grid, the method 600 advances to block 604 in which the inverter controller 126 determines whether to transmit information. The inverter controller 126 may be configured to transmit information periodically or responsively. For example, in some embodiments, the inverter array gateway 112 may "poll" or interrogate each individual inverter 122 to retrieve various information from each inverter 122 (e.g., identification data, operating parameters, etc.). If the inverter controller 126 determines that no information needs transmitted, the method 600 loops back to block 602 in which the inverter controller 126 determines whether the inverter 122 is still connected to the power grid.

Figure 7:
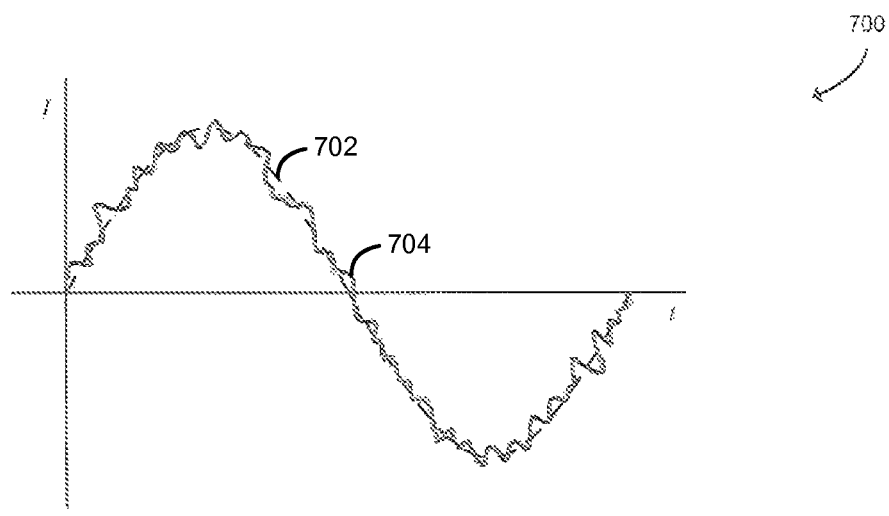
FIG. 7 is a simplified waveform graph of an output signal of the inverter of FIG. 2 during a period of non-communication.
Figure 8:
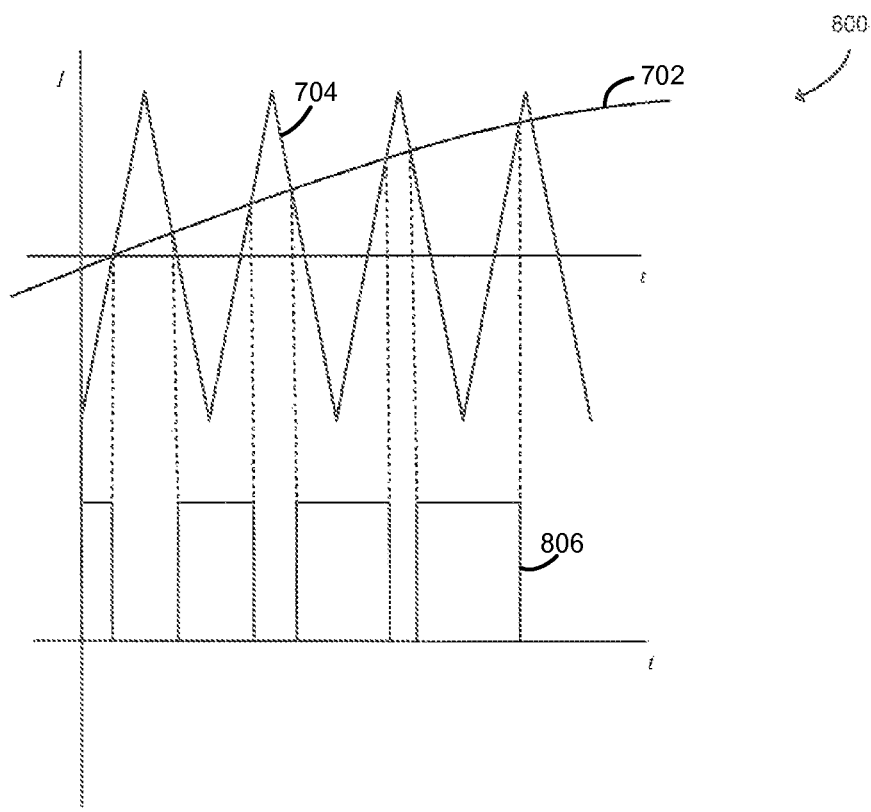
FIG. 8 is a simplified waveform graph of a modulation technique using pulse width modulation.

If, however, the inverter controller 126 determines that there is information to be transmitted in block 604, the method 600 advances to block 606. In block 606, the inverter controller modulates the information to be transmitted onto the output waveform of the inverter 122. For example, as shown in FIG. 7, the inverter 122 may generate an AC power output waveform 700 when no information is being transmitted from the inverter 122. The output waveform 700 includes a low frequency modulation signal 702 and a high frequency carrier signal 704. The output waveform 700 is generated via the operation of the output converter control module 512 and the PWM control module 522 included in the control module 512 as discussed above. For example, the output waveform 700 may be generated using a pulse width modulation signal 802 of the high frequency carrier signal 704 as shown in waveform graph 800 FIG. 8.

Figure 9:
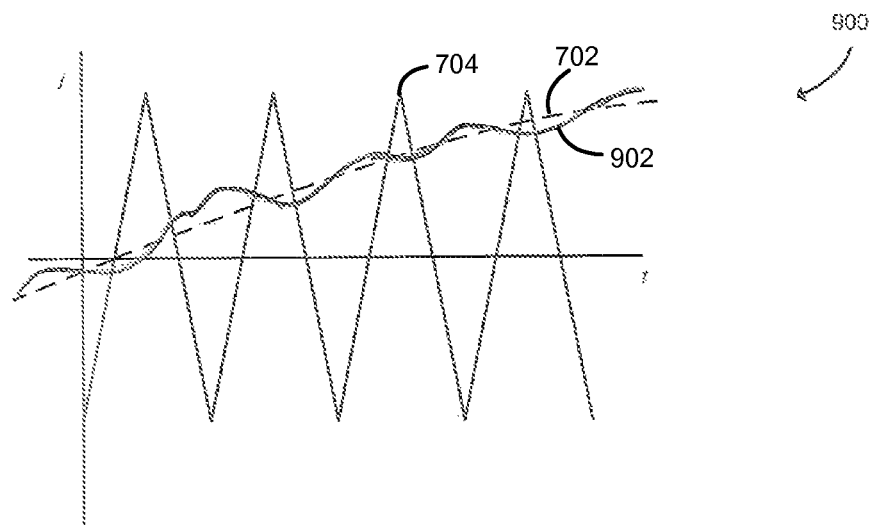
FIG. 9 is a simplified waveform graph of an output signal of the inverter of FIG. 2 with information modulated on the modulation signal of the output signal.

However, when information is to be transmitted, the inverter controller 126 may modulate, or otherwise control the generation of, the output waveform further to incorporate the information therein. For example, in some embodiments, the inverter controller 126 may transmit the information using the modulation signal 702 in block 608. To do so, the inverter controller 126 may control the output converter 202 to modulate the information onto the modulation signal 702 in block 610 of method 600. For example, the PWM control module 522 may generate output switching signals, $q_{OC1}$, $q_{OC2}$, $q_{OC3}$, $q_{OC4}$ to cause the information to be modulated on the modulation signal 702. Any suitable modulation technique may be used to modulate or incorporate the information onto the modulation signal 702. In such embodiments, the output waveform 700 includes the modulation signal 702, the carrier signal 704, and the modulated information signal 902 as shown in the waveform graph 900 of FIG. 9.

Figure 10:
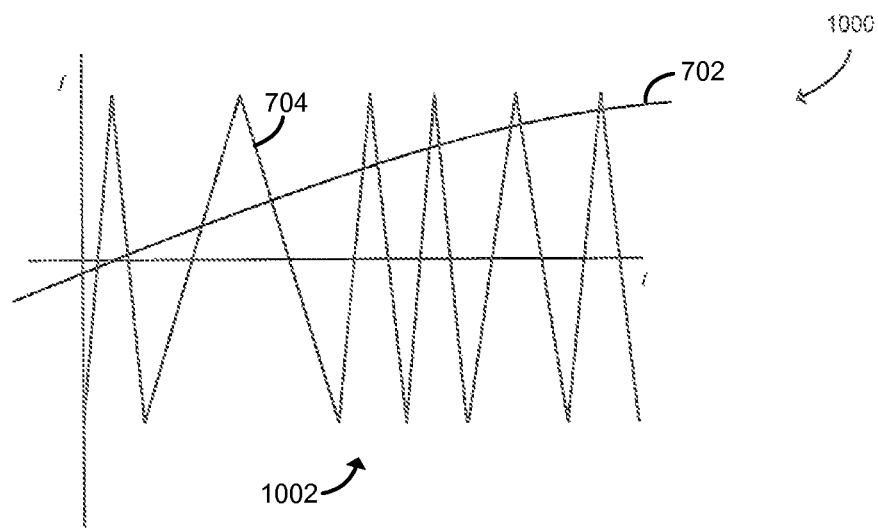
FIG. 10 is a simplified waveform graph of an output signal of the inverter of FIG. 2 with information modulated on the carrier signal of the output signal.

Additionally or alternatively, in some embodiments, the inverter controller 126 may transmit the information using the carrier signal 704 in block 612. To do so, the inverter controller 126 may control the output converter 202 to modulate or incorporate the information onto the carrier signal 704 in block 614. For example, the PWM control module 522 may generate output switching signals, $q_{OC1}$, $q_{OC2}$, $q_{OC3}$, $q_{OC4}$ to cause the information to be modulated on, or otherwise incorporated into, the carrier signal 704 by shifting the frequency of the carrier signal 704. Such shifting of the carrier signal 704 may denote a logic "0," a logic "1," a neutral, and/or other logic levels. For example, in an embodiment in which the nominal frequency of the carrier signal 704 is 100 kHz, the frequency of the carrier signal 704 may be shifted to 99.9 kHz (e.g., about one percent of the nominal frequency) to denote a logic "0" and shifted to 100.1 kHz to denote logic "1" (or vice-versa). Additionally, in embodiments in which the array 102 includes multiple alternative energy source modules 104, the inverter controller 126 of each module 104 may be configured to shift the frequency of the carrier signal 704 by a different amount (e.g., shifting the frequency of the carrier signal 704 to 100.2 kHz and 100.4 kHz to denote logic "0" and logic "1"). An illustrative output waveform 1000 in which information has been modulated on the carrier signal 704 (i.e., the carrier signal has been shifted) is shown in FIG. 10. As with the modulation of the modulation signal 702, the output waveform 1000 includes the modulation signal 702, the carrier signal 704, and the modulated information signal 1002, which is embodied as the frequency shifting of the carrier signal 704.

Referring back to block 602 of method 600 of FIG. 6, if the inverter controller 126 determines that the array 102 is not connected to the power grid, the method 600 advances to block 616. In block 616, the inverter controller 126 determines whether a maintenance tool 160 is connected to the array 102. To do so, the inverter controller 126 may monitor communication traffic on the power line cable 108 for a trigger or command signal configured to indicate that a maintenance tool 160 has been communicatively coupled to the power line cable 108. For example, upon such coupling, the communication circuit 162 of the maintenance tool 160 may be configured to broadcast an alert message to begin communications with the individual inverters 122.

In block 618, the inverters 122 initiate communication with the maintenance tool. In some embodiments, as discussed above, the inverters 122 may be configured to discontinue AC power output in response to detecting that the power line cable 108 is disconnected from the power grid and/or communicative coupling of the maintenance tool 160 in block 620. Because the power line cable 108 is disconnected from the power grid and the inverters 122 are not generating output power to the grid, a communication protocol having a higher data transfer rate (e.g., a Modbus® protocol) than the modulation techniques discussed above may be used to establish communications between the inverters 122 and the maintenance tool 160.

There is a plurality of advantages of the present disclosure arising from the various features of the technologies described herein. It will be noted that alternative embodiments of the technologies of the present disclosure may not include all of the features described yet still benefit from at least some of the advantages of such features. Those of ordinary skill in the art may readily devise their own implementations of technologies that incorporate one or more of the features of the present disclosure and fall within the spirit and scope of the present invention as defined by the appended claims.

The invention claimed is:

1. A method for communicating information from a plurality of inverters configured for the conversion of direct current (DC) power generated from alternative sources to alternating current (AC) power, wherein each inverter of the plurality of inverters includes (i) an input converter to receive a DC power input from a source, (ii) an output converter coupled to a power line cable to supply an AC power output of the corresponding inverter to a power grid, and (iii) an inverter controller to control operation of the corresponding input converter and output converter, the method comprising:

determining, in a first inverter of the plurality of inverters, first information to be transmitted from the first inverter to a remote device over a power line cable connected to the first inverter;

determining, in a second inverter of the plurality of inverters, second information to be transmitted from the second inverter to the remote device over a power line cable connected to the second inverter;

generating, in the first inverter, an output waveform of the first inverter having a carrier signal;

generating, in the second inverter, an output waveform of the second inverter having the carrier signal;

shifting, in the first inverter, a frequency of the carrier signal by a first amount to modulate the first information on the carrier signal; and shifting, in the second inverter, the frequency of the carrier signal by a second amount different from the first amount to modulate the second information on the carrier signal.

2. The method of claim 1, wherein shifting, in the first inverter, the frequency comprises shifting, in the first inverter, the frequency by a first amount less than an original frequency of the carrier signal and shifting, in the first inverter, the frequency by a second amount greater than the original frequency of the carrier signal.

3. The method of claim 1, further comprising:
detecting whether the first inverter has been disconnected from a power grid;
detecting whether a maintenance tool has been communicatively coupled to the power line cable; and
communicating with the maintenance tool using a data transfer rate higher than a data transfer rate of the output waveform of the first inverter having the first information modulated thereon.

4. The method of claim 1, further comprising detecting the first information modulated on the output waveform using a current sensor coupled to the power line cable.

5. The method of claim 4, further comprising demodulating the first information from the carrier signal of the output waveform.

6. A system for communicating information over a power line cable, the system comprising:
a first inverter comprising a first input converter to receive a direct current (DC) power input from a solar panel, a first output converter coupled to a power line cable to supply an AC power output of the first inverter to a power grid, and a first inverter controller to control operation of the first input converter and the first output converter, and a second inverter comprising a second input converter to receive a DC power input from a second solar panel, a second output converter coupled to the power line cable to supply an AC power output of the second inverter to the power grid, and a second inverter controller to control operation of the second input converter and the second output converter, wherein the first inverter controller is to determine first information to be transmitted from the first inverter over the power line cable and control operation of the first output converter to shift a carrier frequency of a carrier signal of an output waveform generated by the first output converter by a first amount to modulate the first information on the carrier signal, and wherein the second inverter controller is to determine second information to be transmitted from the second inverter over the power line cable and control operation of the second output converter to shift the carrier frequency of the carrier signal of an output waveform generated by the second output converter by a second amount different from the first amount to modulate the second information on the carrier signal.

7. The system of claim 6, wherein the output waveform generated by the first output converter comprises the modulation signal, the carrier signal, and the first information to be modulated on the carrier signal.

8. The system of claim 6, wherein the first inverter controller is to shift the frequency of the carrier signal by an amount of less than one percent of the original frequency of the carrier signal.

9. The system of claim 6, wherein the first inverter controller is to shift the frequency of the carrier signal by a first amount less than an original frequency of the carrier signal and shift the frequency by a second amount greater than the original frequency of the carrier signal.

10. The system of claim 6, further comprising a maintenance tool communicatively couplable to the power line cable, wherein the first inverter controller is to (i) detect whether the first inverter has been disconnected from the power grid, (ii) detect whether the maintenance tool has been communicatively coupled to the power line cable, and (iii) communicate with the maintenance tool using a data transfer rate higher than a data transfer rate of the output waveform having the first information modulated thereon.

11. The system of claim 6, further comprising a current sensor coupled to the power line cable to detect the first information modulated on the output waveform.

12. The system of claim 11, further comprising an inverter array gateway communicatively coupled to the current sensor and comprising a demodulator to demodulate the first information from the carrier signal.

\* \* \* \* \*